United States Patent Office 2,963,487
Patented Dec. 6, 1960

2,963,487

OZONOLYSIS OF NORBORNYLENES

Robert H. Perry, Jr., Baytown, Tex., assignor, by mesne assignments, to Esso Research and Engineering Company, Elizabeth, N.J., a corporation of Delaware No Drawing. Filed Sept. 26, 1957, Ser. No. 686,296

5 Claims. (Cl. 260—339)

This invention relates to the conversion of bicyclic monoolefins to more valuable oxygen derivatives thereof. More particularly, this invention relates to a process for the treatment of bicyclo (2.2.1)-2-heptenes with ozone in order to provide stable ozonide intermediates and to the oxidation of such intermediates to cis-1,3-cyclopentane dicarboxylic acids.

It has been surprisingly discovered in accordance with the present invention that bicyclo (2.2.1)-2-heptenes, when ozonized in solution in an ozone inert solvent at a temperature within the range of about −75° to about +25° C., provide a quantitative yield of a white solid ozonide which has the unexpected properties of being comparatively stable at room temperatures and being insensitive to shock. As a consequence, the polymeric ozonide product may be stored for limited periods of time without material decomposition and may be handled by conventional processing equipment because of its nonexplosive characteristics. Unfortunately, the polymeric ozonides are also comparatively stable with respect to oxygen and are therefore converted to the corresponding cyclopentane dicarboxylic acids only with difficulty. It has been further discovered that this problem may be overcome and that the polymeric ozonides may be economically converted to cyclopentane dicarboxylic acids with comparative ease by oxidizing such ozonides with molecular oxygen having a catalytic amount of ozone associated therewith in the presence of a solvent selected from the class consisting of water and aliphatic monocarboxylic acids at a temperature intermediate about 70° C. and reflux temperature.

The feed stock for the present invention is a bicyclo-(2.2.1)-2-heptene. Such compounds may be prepared in substantially quantitative yield by the Diels-Alder reaction of cyclopentadiene or dicyclopentadiene with an aliphatic monoolefin such as ethylene, propene, 1-butene, 2-butene, 1-pentene, 2-methyl-2-butene, etc. Representative bicyclo(2.2.1)-2-heptenes obtainable in this fashion include compounds such as norbornylene [bicyclo-(2.2.1)-2-heptene], 5-methyl-bicyclo(2.2.1)-2-heptene, 5-propyl-bicyclo(2.2.1)-2-heptene, 5-ethyl-bicyclo(2.2.1)-2-heptene, 5,5,6-trimethyl-bicyclo(2.2.1)-2-heptene, 5,6-dimethyl-bicyclo(2.2.1)-2-heptene, etc. and suitable mixtures thereof. In general, it may be stated that the starting material for the present invention may be selected from the class consisting of norbornylene and $C_1$ to $C_4$ alkyl substituted norbornylenes.

The norbornylene starting material is ozonized in solution in an organic solvent which is inert to ozone under the ozonization conditions employed. The resistance of a solvent toward attack by ozone varies from compound to compound, some solvents being more resistant to attack by ozone than others. Ozone is such a powerful oxidizing agent that nearly all pure solvents are attacked to some extent at ambient conditions. However, the bicyclo(2.2.1)-2-heptenes of the present invention are highly susceptible to ozonolysis and, therefore, when the ozonolysis reaction is conducted at a temperature within the range of about −75° to about +25° C., a solvent may be selected which will be non-reactive with ozone in the presence of the olefinic starting material of the present invention. Accordingly, as used in the present specification, the term "inert solvent" refers to an organic solvent which is inert (non-reactive) with respect to ozone and the intermediates and products formed during ozonization of bicyclo(2.2.1)-2-heptene at an ozonolysis temperature of about −75° to about +25° C. Representative solvents of this nature include esters of $C_1$ to $C_4$ aliphatic alcohols with $C_1$ to $C_4$ monocarboxylic acids such as, for example, methyl formate, ethyl formate, methyl acetate, ethyl acetate, etc., halogenated hydrocarbons such as carbon tetrachloride, chloroform, etc.

It will be understood that the ozonolysis reaction will be conducted above the freezing point of the solvent. Thus, for example, when carbon tetrachloride is the solvent, the ozonolysis reaction should be conducted at a temperature of not less than about −25° C. in order to prevent solidification of the carbon tetrachloride solvent.

Although the ozonolysis reaction of the present invention may be conducted at a temperature within the range of about −75° to about +25° C., it is generally preferable to employ an ozonolysis temperature within the range of about −75° to about −40° C. in order to minimize volatilization of the bicyclo(2.2.1)-2-heptene starting material.

At least about 1 mol of organic inert solvent per mol of bicyclo(2.2.1)-2-heptene should be employed and it is generally preferable to utilize an excess of solvent such as, for example, from about 5 to 20 mols of solvent per mol of cyclic monoolefin.

The solution of monoolefin in an inert organic solvent is preferably ozonized by contacting the solution with a mixture of oxygen and ozone containing from about 2 to 6 volume percent of ozone, the ozone-oxygen mixture being passed through the solution at a rate which is preferably within the range of 0.01 to about 0.5 cubic foot of gaseous mixture per liter of solution per minute. The mixture of ozone and oxygen should be passed through the monoolefin solution until the theoretical amount of ozone has been absorbed. The ozonolysis reaction may then be terminated in that substantially quantitative conversion of the bicyclic monoolefin will have occurred. At the end of the ozonolysis reaction, the ozonolysis products remain in solution in the organic inert solvent at temperatures of about −75° to −40° C. However, when this solution is warmed to ambient temperatures, and treated with a precipitating agent such as ligroin, an odorless, white powdery solid precipitate is formed which, after formation, is essentially insoluble in all common organic solvents. The precipitate is insensitive to shock, melts with decomposition at a temperature within the range of about 95° to 105° C. and burns violently in an open flame. The precipitate is comparatively stable. Thus, it may be stored in a dry, "inert" atmosphere for several weeks with only minor decomposition. On exposure to the open atmosphere, decomposition occurs slowly and an appreciable loss of active oxygen and conversion to aldehydic products will occur after about two weeks.

The reaction product shows no immediate evidence of reaction at ambient conditions with water, aqueous hydrogen peroxide, hydrochloric acid, and lead tetraacetate in methanol. It does, however, decompose slowly on standing at room temperature for several hours in aqueous solvents. It is faintly reactive with acetic acid solutions of sodium iodide and is moderately reactive with boiling water and boiling aqueous solutions of sodium hydroxide. The reaction products in the latter two situations are strongly aldehydic products.

Based on such properties as solubility, melting point, swollen nature of the raw ozonolysis product in solution, its reactivity, and similarity in general behavior to known polymeric ozonides, it appears that the product may be a polymeric ozonide having the following simple recurring unit:

(I)

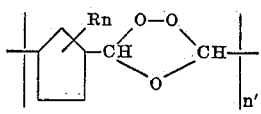

Wherein R is a $C_1$ to $C_4$ alkyl group replacing hydrogen on the cyclopentane ring when the starting material is a subsituted norbornylene;
Wherein $n$ is an integer of 1 to 3; and
Wherein $n'$ is an integer with a value normally in the range of 4 to 10.

There is evidence of cross-linking in the molecule to provide large cyclic ozonides of the following formula:

(II)

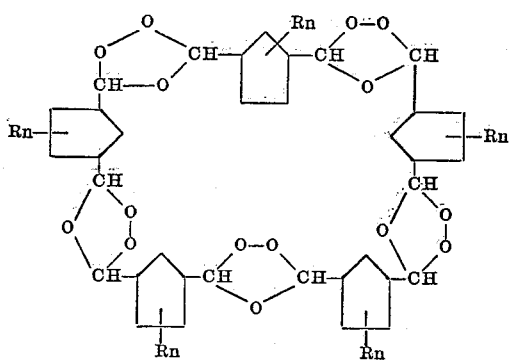

Wherein R is a $C_1$ to $C_4$ alkyl group replacing hydrogen on the cyclopentane ring when the starting material is a substituted norbornylene; and
Wherein $n$ is an integer of 1 to 3.

The crystalline ozonide product of ozonolysis finds particular utility as a raw material for the preparation of unsubstituted and alkyl substituted cis-1,3-cyclopentane dicarboxylic acids. This may be accomplished, in general, by oxidizing the ozonide product in the presence of a molar excess of aqueous hydrogen peroxide or an aliphatic peroxy monocarboxylic acid. The desired reaction is allowed to proceed at reflux temperature (90° to 100° C.) over a period of several hours. However, oxidation of the ozonide to a dicarboxylic acid presents difficulties. Thus, for example, low yields of highly contaminated product are obtained in most instances. One manner in which a high yield of substantially pure dicarboxylic acid may be obtained is through the oxidation of the ozonide intermediate with hydrogen peroxide in solution in a monocarboxylic acid at a temperature intermediate about 50° and 100° C. However, in order to obtain the desired purity in yield, it is necessary to permit the ozonide intermediate to stand at room temperatures for a period of time within the range of from about 10 to 30 hours prior to the hydrogen peroxide oxidation reaction.

It has been discovered that a surprisingly high yield of pure dicarboxylic acid is obtainable with short reaction cycles by oxidizing the ozonide intermediate with molecular oxygen in the presence of a catalytic amount of ozone, with the intermediate in suspension in a molar excess (e.g., 10 to 30 mols) of a solvent selected from the class consisting of water and acetic acid, such reaction being conducted at a temperature in the range between about 50° to 100° C. for a reaction time within the range of about 2 to 10 hours. It is generally preferable to employ reflux temperature at a reaction time of about 3 to 6 hours.

The invention will be further illustrated by the following specific examples which are given by way of illustration and not as limitations on the scope of this invention.

OZONOLYSIS OF BICYCLO(2.2.1)-2-HEPTENES

*Example I*

Dissolve about 3 grams of norbornylene in about 60 ml. of ethyl acetate and chill the resultant solution to about —60° C. Pass a mixture of oxygen and ozone containing about 4 mol percent of ozone through the resultant solution at the rate of about 16 liters of mixture per hour. Continue to pass the oxygen-ozone mixture through the ethyl acetate solution until 1 mol of ozone per mol of norbornylene has been absorbed. This may be readily detected by passing the tail gas from the reactor through a potassium iodide solution and by terminating the flow of ozone when reaction of the potassium iodide with ozone in the tail gas is initiated.

At the end of the ozonolysis reaction, the reaction mixture consists of a clear colorless solution. Warm the solution to room temperature. A while, solid, odorless precipitate is formed. Recover the solid by filtration. The yield is quantitative, based on the norbornylene starting material.

The precipitate is insoluble in organic solvents, is decomposed at elevated temperatures by pyridine and other bases, is insensitive to shock, and melts with decomposition to gas over a range of 95° to 105° C. The precipitate reacts with boiling water to form oily, aldehydic decomposition products and reacts vigorously with 2,4-dinitrophenyl hydrazine to give a yellow precipitate which decomposes to a dark gum on standing.

The precipitate gives a positive test for active oxygen. The precipitate decomposes slowly on standing in the atmosphere at room temperature. The decomposition is evident after about 5 to 10 days because of the development in the product of a strong, aldehydic odor. In addition, the solid, powdery ozonide is converted into a gummy, slightly discolored residue. The elemental analysis on the fresh ozonide is as follows:

| Elemental | Actual | Calculated for $C_7H_{10}O_3$ |
|---|---|---|
| Percent C | 58.30 | 59.15 |
| Percent H | 7.48 | 7.04 |
| Percent O | 34.31 | 33.80 |

The freshly prepared precipitate contains not more than about 4 percent active oxygen (theoretical for monomeric $C_7H_{10}O_3$ is 11.3 percent oxygen). Based upon the foregoing, it appears that the structural formula for the precipitate is as follows:

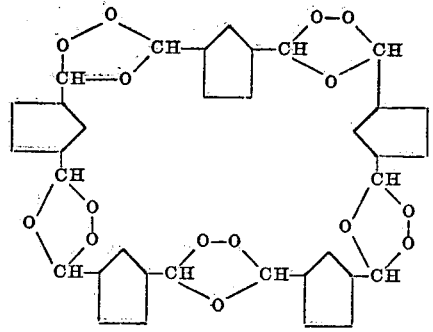

When an equimolar amount of 5-methyl-bicyclo(2.2.1)-2-heptene is substituted for norbornylene and Example I is otherwise repeated, equivalent results are obtained. In this case, however, the product is poly(methyl norbornylene ozonide).

In like manner, ozonides may be obtained from other alkyl substituted bicyclo(2.2.1)-2-heptenes such as 5-ethyl bicyclo(2.2.1)-2-heptene, 5,6-dimethyl bicyclo(2.2.1)-2-heptene, and suitable mixtures thereof.

Example II

Repeat Example I but in this instance conduct the ozonolysis reaction at a temperature of about −75° C. Again, at the end of the ozonolysis reaction, a clear colorless solution is obtained. On being slowly warmed, the solution turns cloudy at a temperature within the range of about −40° to about −20° C. and definite precipitation is initiated at a temperature of about 10° C.

Example III

Repeat Example I but, in this instance, substitute carbon tetrachloride for the ethyl acetate and ozonize at −25° C. At the end of the ozonolysis, partial precipitation of product occurs, and again a quantitative yield of a white, solid ozonide is obtained on warming of the reaction solution to room temperature.

Example IV

Repeat Example I but, in this instance, utilize chloroform as the solvent and conduct the ozonolysis at a temperature of about −75° C. In this instance, warming of the clear colorless reaction mixture to room temperature produces only moderate precipitation of the ozonide product. Essentially quantitative precipitation is obtained through the addition of one volume of ligroin per volume of chloroform.

PREPARATION OF CIS-1,3-CYCLOPENTANE DICARBOXYLIC ACIDS

Example V

Dissolve about 1.25 grams of the ozonolysis product of Example I in about 20 ml. of 90% aqueous formic acid and add thereto about 30 weight percent (based on the ozonide) of hydrogen peroxide. The mixture is allowed to stand at room temperature until most of the active oxygen has disappeared (23 hours). Boil the resultant solution for about 1 hour (reaction temperature about 95° C.) to decompose the remainder of the peroxidic compounds. At the end of this time the solvent is evaporated and a white, solid residue is obtained. The crude cis-1,3-cyclopentane dicarboxylic acid thus obtained is recrystallized from a minimum amount of cold water. A 95% yield of white, very pure cis-1,3-cyclopentane dicarboxylic acid is obtained (based on the norbornylene starting material) (m.p. 120.5° to 121.5° C., neutral equivalent about 79.0).

Example VI

Dissolve about 2.7 grams of the freshly prepared ozonide of Example V in about 35 ml. of 90% formic acid, and add about 15 ml. of 30% hydrogen peroxide to the thus-formed solution. Heat the resultant mixture to 50° C. and permit the solution to reflux for about 5 minutes. Thereafter, retain the mixture at reflux temperature (about 90° to 100° C.) for about 1 hour. About a 37% yield of impure yellow-colored cis-1,3-cyclopentane dicarboxylic acid is obtained on evaporation of the solvent and recrystallization of the product in water as in Example V.

Example VII

Dissolve about 21 grams of the freshly prepared precipitate of Example I in about 16 ml. of acetic acid and add about 15 ml. of 40% peracetic acid in the resultant solution. Heat the resultant solution at reflux temperature (about 100° C.) for about 1½ hours. Decomposition of the ozonide occurred and a crystalline product was not obtained.

Example VIII

Dissolved about 4.2 grams of the freshly prepared ozonide of Example I in about 50 ml. of 75% acetic acid and pass a mixture of oxygen and ozone containing about 0.28 weight percent of ozone through the resultant solution at reflux temperature for a period of about 4 hours. The isolated product consists essentially of cis-1,3-cyclopentane dicarboxylic acid (the yield in this case being 84%). About 0.05 mol of ozone per mol of olefin were consumed during the oxidation reaction.

When the example is repeated using a mixture of ozone and oxygen containing about 0.1 weight percent of ozone for a reaction time of about 12.5 hours substantially the same yield of pure cis-1,3-cyclopentane dicarboxylic acid is obtained. This shows that there is no material advantage in utilizing a reaction period of more than about 10 hours.

Example IX

Repeat Example VIII but, in this instance, substitute formic acid for the acetic acid solvent. About 0.13 mol of ozone is consumed during the oxidation process. The isolated product, obtained in 56% yield, was an impure cis-1,3-cyclopentane dicarboxylic acid containing yellow impurities.

Example X

Add about 4.0 grams of the freshly prepared ozonide of Example I to about 60 ml. of water and heat the resultant suspension of ozonide and water to reflux temperature. Pass a mixture of oxygen and ozone containing about 0.15 weight percent of ozone through the refluxing solution for about 6½ hours. About 0.05 mol of ozone was consumed per mol of norbornylene starting material. The isolated product, obtained in 80% yield, was white very pure cis-1,3-cyclopentane dicarboxylic acid.

What is claimed is:

1. A process which comprises ozonizing a compound selected from the group consisting of norbornylene and norbornylenes substituted on the norbornylene nucleus with $C_1$ to $C_4$ alkyl groups in solution in an ozone inert solvent at a temperature within the range of from about −75° to about +25° C., whereby a solvent soluble ozonolysis product is obtained, insolubilizing said ozonolysis product to provide a nonexplosive, white, odorless, solid, solvent insoluble polymeric ozonide, recovering said polymeric ozonide, oxidizing said ozonide in suspension in a solvent selected from the group consisting of water and acetic acid with molecular oxygen in the presence of a catalytic amount of ozone at a temperature within the range of about 50° to 100° C. for a period of time within the range of about 2 to 10 hours to thereby substantially selectively convert said ozonide to the corresponding cis-1,3-cyclopentane dicarboxylic acid and recovering said dicarboxylic acid.

2. A process as in claim 1 wherein the compound is norbornylene.

3. A process which comprises ozonizing a compound selected from the group consisting of norbornylene and norbornylenes substituted on the norbornylene nucleus with $C_1$ to $C_4$ alkyl groups in solution in an ozone inert solvent at a temperature within the range of from about −75° to about +25° C., whereby a solvent soluble ozonolysis product is obtained, insolubilizing said ozonolysis product to provide a nonexplosive, white, odorless, solid, solvent insoluble polymeric ozonide, recovering said polymeric ozonide, dissolving said polymeric ozonide in an aqueous solution of formic acid, adding an aqueous solution of hydrogen peroxide to said formic acid solution at room temperature, maintaining the resultant mixture at about room temperature for a period of time sufficient to permit the disappearance of substantially all of the active oxygen components of said polymeric ozonide and thereafter refluxing the resultant solution for a period of time sufficient to substantially completely decompose the remainder of said polymeric peroxide whereby said polymeric ozonide is substantially completely selectively converted to the corresponding cis-1,3-cyclopentene dicarboxlic acid and recovering said dicarboxylic acid.

4. A process as in claim 3 wherein the compound is norbornylene.

5. A white odorless solvent insoluble polymeric ozonide melting with decomposition at a temperature of 95° to 105° C. prepared by ozonizing norbornylene in solution in an ozone inert solvent at a temperature within the range of about −75° to about +25° C., whereby an ozonolysis product is formed, insolubilizing said ozonolysis product to provide said polymeric ozonide and recovering said polymeric ozonide.

References Cited in the file of this patent

UNITED STATES PATENTS

| | | |
|---|---|---|
| 2,750,411 | Fisher | June 12, 1956 |
| 2,848,490 | Friedrich et al. | Aug. 19, 1958 |

OTHER REFERENCES

S. F. Birch et al.: J. Chem. Soc. (London), 1947, pp. 818–820.

Von Gust. Komppa et al.: Annalen der Chemie, vol. 429, pp. 175–180 (1922).

G. S. Fisher et al.: Ind. Eng. Chem., vol. 47, pp. 1569–1572, August 1955.

Frank Holloway et al.: Ind. and Eng. Chem., vol. 47, pp. 2111–2113, October 1955.